United States Patent [19]

Coccagna

[11] 3,739,288

[45] June 12, 1973

[54] DEMODULATING CIRCUIT EMPLOYING PHASE SHIFTING TECHNIQUES

[75] Inventor: Edmund G. Coccagna, Villanova, Pa.

[73] Assignee: Mohawk Data Sciences Corporation, Herkimer, N.Y.

[22] Filed: Oct. 8, 1970

[21] Appl. No.: 79,103

[52] U.S. Cl. .............. 329/104, 178/66 R, 325/320, 328/109, 328/118, 329/112

[51] Int. Cl. .............................................. H04l 27/14

[58] Field of Search .................. 329/104, 110, 172; 325/320, 349; 178/66; 328/109, 155, 118

[56] References Cited

UNITED STATES PATENTS

| | | | |
|---|---|---|---|
| 3,569,845 | 3/1971 | Steinberg | 325/349 X |
| 3,401,346 | 9/1968 | Brown et al. | 329/104 |
| 3,559,083 | 1/1971 | Crouse | 329/104 |
| 2,904,683 | 9/1959 | Meyer | 329/104 X |
| 3,092,736 | 6/1963 | Ernyei | 329/104 X |
| 3,205,438 | 9/1965 | Buck | 329/110 UX |
| 3,381,220 | 4/1968 | Burr | 329/104 UX |

*Primary Examiner*—Alfred L. Brody
*Attorney*—Francis J. Thomas, Richard H. Smith, Thomas C. Siekman and Sughrue, Rothwell, Mion, Zinn and Macpeak

[57] ABSTRACT

A circuit and method for converting into digital representation binary-coded input data represented by two different frequencies in an input signal. The input signal is fed to a phase-shifting circuit that generates a signal which lags or leads the input signal depending on which of the two input frequencies occur. The input signal and the output from the phase-shifting circuit are thereafter both fed to a phase-detecting circuit which provides a digital output signal indicative of whether the phase-shifted signal lags or leads the input signal. Thus, the digital output of the phase-detecting circuit indicates which of the two different frequencies occurs in the input signal.

17 Claims, 3 Drawing Figures

INVENTOR.
EDMUND G. COCCAGNA
BY Thomas C. Siekman
ATTORNEY

DEMODULATING CIRCUIT EMPLOYING PHASE SHIFTING TECHNIQUES

BACKGROUND OF THE INVENTION

This invention relates to data transmission and, more particularly, to a novel demodulating circuit and method useful in data transmission.

In the data processing industry it is now common practice to transmit binary-coded data over conventional telephone lines. In one method utilized for such transmission, data is transmitted by modulating the frequency of a carrier wave with one particular frequency designating a mark bit (binary 1) and another frequency designating a space bit (binary 0). At the receiving station, the data must be demodulated or converted from its analogue frequency-encoded form to digital signals (e.g., signals where a high voltage represents a binary 1 while a low voltage represents a binary 0) which may be utilized by digital data processing devices.

SUMMARY OF THE INVENTION

Therefore, it is the primary object of the invention to provide a simple, inexpensive and reliable demodulating circuit and method.

According to the invention, in a demodulating circuit and method for decoding data represented by different frequencies in an input signal, a signal is generated having various phase differences with the input signal. Each of the phase differences occurs in response to a different frequency in the input signal. The phase differences between the generated signal and the input signal are then detected by a circuit which provides an output signal indicative of the various phase differences.

If the input signal represents binary-coded data and occurs at two different frequencies with one frequency representing a binary 1 (mark) and another frequency representing a binary 0 (space), preferably, the generated signal either lags or leads the input signal depending on which of the two frequencies is present. The phase-detecting circuit thereafter determines which signal leads and provides a digital output signal representing the binary-coded data.

The preferred form of phase-detecting circuit includes a circuit which is bistable for predetermined periods of time, the state of this circuit during each such period being dependent on whether the input signal or the generated signal is leading. The state of the circuit when bistable is ascertained and the phase-detecting circuit provides an output signal indicative thereof and, thus, representing the binary-coded data of the input signal.

DESCRIPTION OF THE PREFERRED EMBODIMENT

Figure 1:
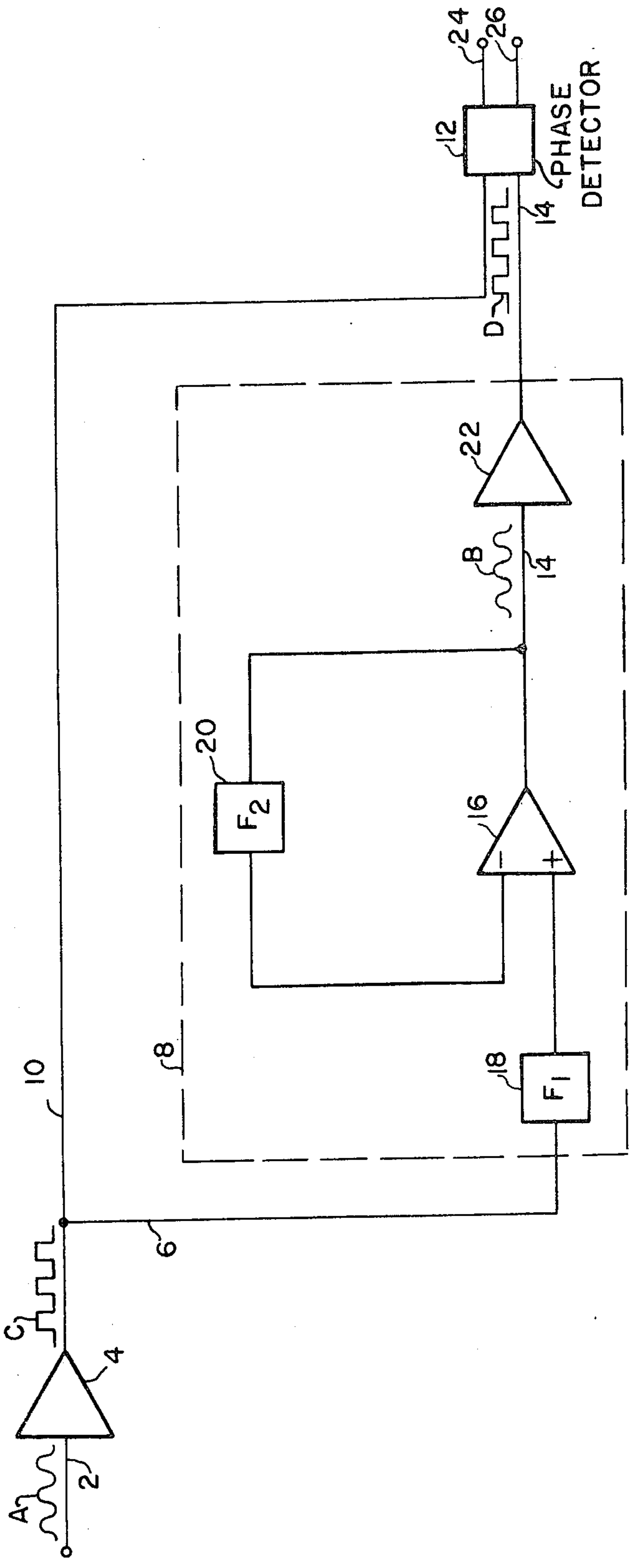
FIG. 1 is a schematic diagram of a preferred embodiment of the invention.
Figure 3:
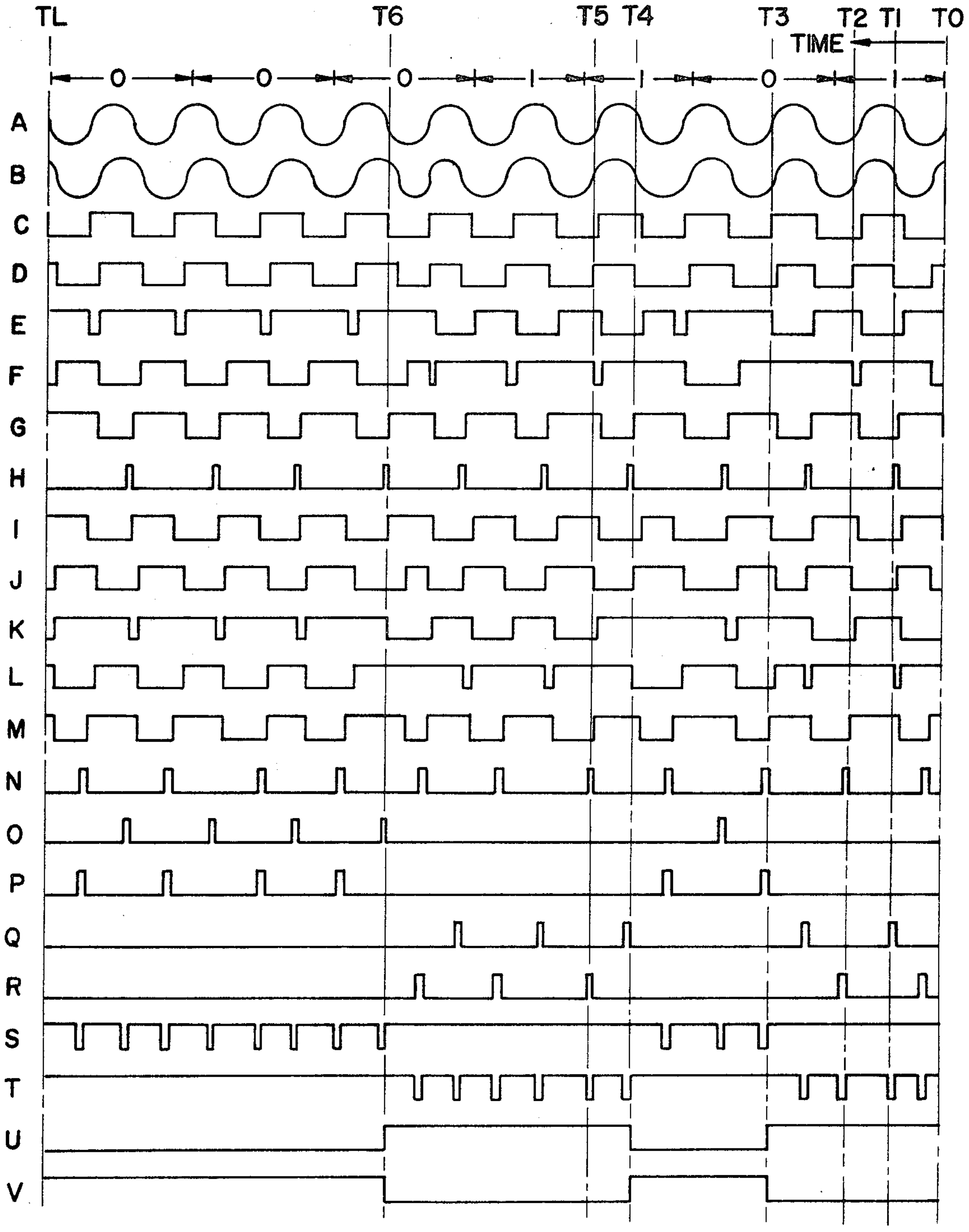
FIG. 3 is a waveform diagram illustrating with an example the operation of the preferred embodiment shown in FIGS. 1 and 2.

An analogue input signal A on lead 2 is received by the demodulating circuit illustrated in FIG. 1. As illustrated in FIG. 3, the frequency of the input signal A is modulated between two frequencies so as to represent binary-coded data. The higher frequency (e.g., 2225 Hz.) represents a binary 1 or mark bit while a binary 0 or space bit is represented by the lower frequency (e.g., 2025 Hz.). The signal A may be and generally is one which has been transmitted over telephone or other communication lines. As an example, the input signal A shown in FIG. 3 represents the binary data 1–0–1–1–0–0–0 received by the demodulating circuit between time T O and a later time T L.

In the demodulating circuit, the signal A is initially fed to a shaper 4 which converts the analogue signal A to digital form as signal C shown in FIG. 3. The signal C is a series of digital pulses occurring at the same frequencies as, and in phase with, the analogue signal A. These pulses are defined by negative to positive to negative transitions which correspond to the voltage modulations in signal A. The input signal in digital form C is fed over lead 6 to a phase-shifting circuit 8. The signal C is also fed over lead 10 to a phase-detecting circuit 12 which also receives the output signal of the phase-shifting circuit 8 on lead 14.

As seen from FIG. 1, the phase-shifting circuit 8 comprises an operational amplifier 16 having a first filter 18 connected to its non-inverting input and a second filter 20 connected in a feedback loop between its output and its inverting input. The first filter is a band pass filter for the frequency range of interest (in our example 2025–2275 Hz). The second filter is a band reject filter with a center frequency between the frequency which represents a 1 (2225 Hz) and the frequency which represents the 0 (2025 Hz). The input signal in digital form C is fed to the amplifier 16 through the first filter 18. The filters 18 and 20 and the operational amplifier 16 are arranged and chosen such that the phase of the signal B on lead 14 from the amplifier's output is shifted with respect to the phase of the input signal A (or C). This shift is such that when the input signal is at one of its two frequencies the signal B will lead the input signal A. However, the signal B will lag the input signal A when the input is at its other frequency.

Referring to FIG. 3, when signal A is at the particular lower frequency which designates a space (binary 0) bit, the signal B leads the input signal A. When the input signal A is at its other and higher frequency designating a mark (binary 1) bit, the signal B lags the input signal A.

The phase-shifting circuit 8 also includes a shaper 22 which receives as its input the signal B in analogue form and converts it to digital form as the signal designated D in FIG. 3. Of course, signals B and D have the same frequencies and are in phase with each other, signal D being merely B in digital form.

The phase detector 12 receives the signal D on lead 14 and the signal C on lead 10. Since the signal C is the digital representation of the analogue input signal A and the signal D is the digital output from the phase-shifting circuit 8, signal D lags or leads the signal designated C depending on the frequency of the input signal A.

The phase-detecting circuit 12 determines which of the signals C or D lags or leads the other and provides a binary digital signal over its output leads 24 and 26 in response. One of the leads 24 or 26 will have a high voltage thereon with the other lead having a low voltage. Thus, the phase detector's output represents the data represented by the different frequencies in the input signal A as digital signals which may be used with digital data processing equipment.

Figure 2:
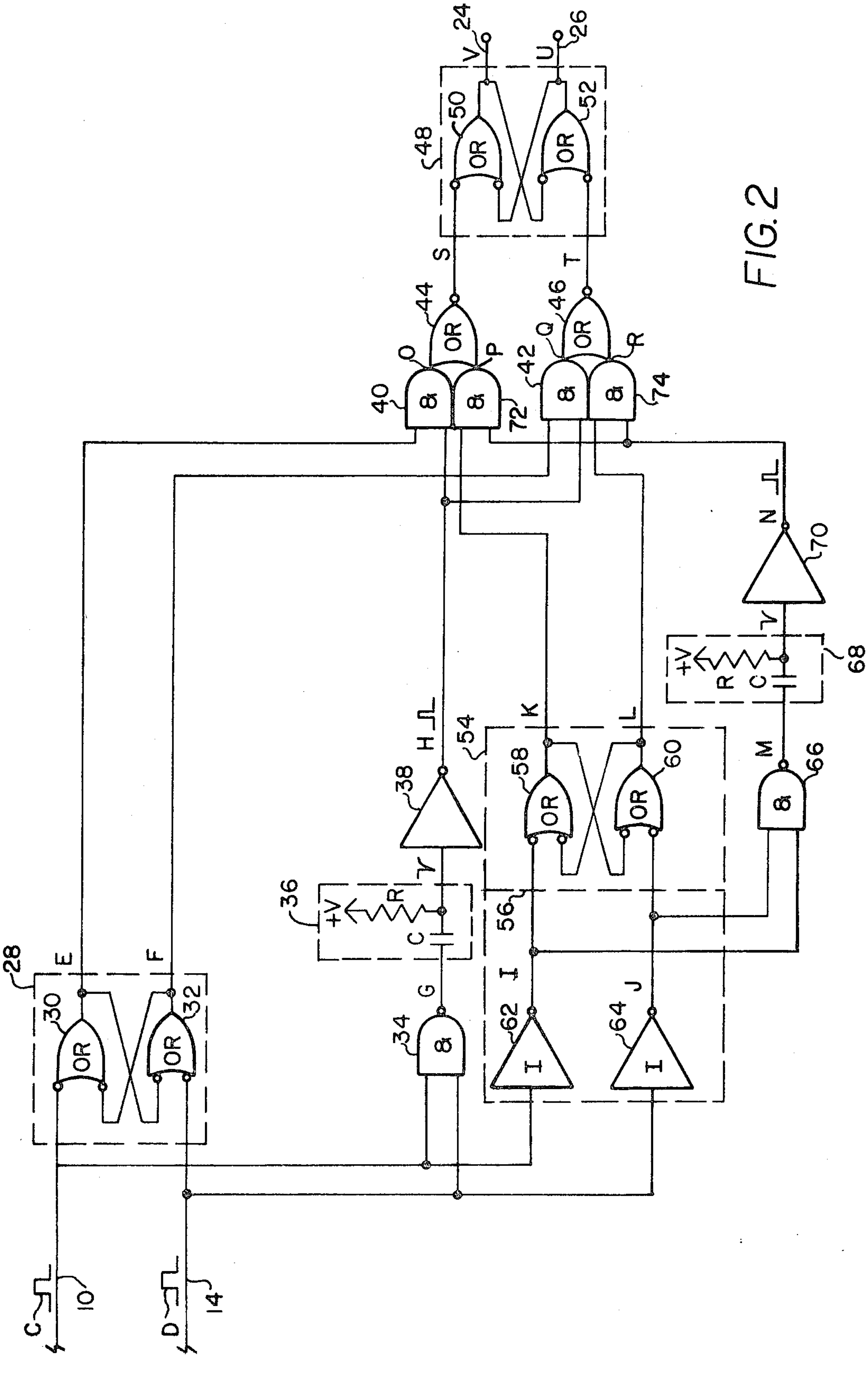
FIG. 2 is a schematic logic diagram of a preferred embodiment of phase-detecting circuit for use in the invention.

Any suitable phase detector which is adapted to provide a digital output indicative of which of the signals C or D lags or leads the other may be used. However, the preferred form of phase detector for use in the invention is disclosed in FIG. 2. FIG. 2 is a logic circuit diagram whose circuit symbols are in accordance with MIL–STD–806B standard approved by the Department of Defense, effective Feb. 26, 1962. It is to be understood that the logic circuit symbols of FIG. 2 operate in a conventional manner wherein the inputs to the circuits and the outputs therefrom always exist at either of two discrete voltage levels, the high (or positive) voltage level of the digital system or the lower (or negative) voltage level of the system.

In accordance with the standard, a circuit for performing an AND function is represented by a D-shaped block containing the & symbol. The input lines are always connected to the straight side of the block and the output line is always connected to the curved side of the block. The function of the AND circuit is to provide a high output voltage only when all input lines exist at the high level. When a small circle appears at the point where the output line joins the block, the function of the circuit is to provide a low level voltage output only when all inputs are at the high level.

A circuit for performing the logical OR function is represented by an arrow-shaped block containing the symbol OR. The function of the OR circuit is to provide a high level output only when any one or more of the input lines is at the high level. When a small circle appears at the point where the output line joins the block, then the function of the circuit is to provide a low level output only when one or more input lines is at the high level. Conversely, when small circles appear where the input lines join the block, the function of the circuit is to provide a high level output only when any one or more of the input lines is at the low level.

An inverter circuit is represented by a triangular block containing the symbol "I" and having a small circle at the point where the output line joins the block. The function of this circuit is to provide an output level which is always opposite to the input level.

As previously noted, both the signals C and D each comprise a series of positive digital square-wave pulses. The signal C is the input analogue signal A in digital form with its pulses occurring at the frequencies of the signal A. The signal D is a series of digital square-wave pulses corresponding to the pulses in the input signal but being shifted in phase so that it lags or leads the input signal depending on the input signal's frequency. However, the phase differences between C and D are small enough so that each pulse in the shifted signal D overlaps its corresponding pulse in signal C. That is, each pulse in signal D is fed to the phase-detecting circuit 12 concurrently with part of its corresponding pulse in signal C.

Referring to FIG. 2, the digital signals C and D are fed to the phase-detecting circuit as inputs to a circuit 28 having two OR gates, 30 and 32. OR gate 30 receives the C signal and OR gate 32 receives the D signal. The signals C and D are also fed to a two-input AND gate 34 which provides a low signal at its output G when both signals C and D are high, i.e., when the positive pulses in C and D overlap. This will occur at the leading edge of a pulse in the lagging signal.

A differentiating circuit 36 is connected to the output of AND 34. It comprises a capacitor C and a resistor R connected to a d.c. voltage such that in the quiescent state a high level voltage occurs at the output of circuit 36. When AND gate 34 is activated it provides a high to low transition at G. The differentiating circuit 36 detects this transition and applies a negative spike to the input of shaper 38.

The shaper 38 converts the spike into a digital square-wave pulse at its output H. As seen from the small circle at its output, the shaper also provides an output signal which is opposite to its input and, therefore, the square wave at H is positive while the spike at the shaper's input is negative. Each such square pulse is utilized for timing purposes.

As seen from FIG. 3, the OR gates 30 and 32 in circuit 28 are arranged such that the circuit 28 is bistable at each time such a timing pulse is generated. That is, each time a pulse appears at H, one of the circuit's outputs, E or F, will be positive and its other output negative. The timing pulses occur in response to the leading edges of pulses in the signal, C or D, which is lagging at that time. The circuit 28 is bistable for each period occurring between the time it receives such a leading edge of a pulse in the signal which is then lagging and the time it receives the lagging edge of the corresponding overlapping pulse in the signal which is then leading.

As illustrated at time T 1 in FIG. 3, the voltage at the E output is negative with that at the F output positive during a timing pulse at H when the signal C leads the signal D. As illustrated at time T 6 in FIG. 3, when the signal C lags signal D, the voltage at E is positive with that at F negative when a timing pulse occurs at H. Thus, the circuit 28 is bistable each time a timing pulse appears at the output H of shaper 38 and state of the circuit 28 at such times is dependent on whether the signal C leads D or vice versa.

AND gates 40 and 42 are provided to gate the two outputs of the circuit 28 with the timing pulses generated at H. AND gate 40 receives the signal from the E output of circuit 28 and the timing pulses from the shaper 38 and, when these two signals are high, provides a high voltage at its output O.

AND gate 42 receives as its inputs the signal from the F output of circuit 28 and the timing pulses. AND gate 42 provides a positive voltage at its output Q in response to high voltages at its inputs.

The output voltages of AND gates 40 and 42 are fed via OR gates 44 and 46 to the inputs, S and T, of a circuit 48 which comprises two OR gates 50 and 52. The circuit 48 is identical with the circuit 28 and thus has certain bistable properties. Its outputs, U and V, are applied to the output leads 26 and 24 respectively of the phase-detecting circuit (FIG. 1).

OR gate 44 provides a low level signal at the S input of circuit 48 in response to a high signal at the O output of AND gate 40 while OR gate 46 provides a low level signal at the T input of circuit 48 in response to a high level signal at the Q output of AND gate 42.

As illustrated by FIG. 3, circuit 48 always acts in a bistable manner. Whenever a positive signal appears at its U output a negative signal appears at its V output. Conversely, a positive voltage at its V output always appears with a negative voltage at its U output. As also illustrated in FIG. 3, the voltage at its U output goes from negative to positive in response to a negative going transition at its T input provided a positive voltage appears at its S input. Also, the voltage at its U output goes from positive to negative in response to a negative going transition at its S input if a positive voltage appears at its T input. A high signal at the U output (and a simultaneous low signal at the V output) indicates a binary 0 bit on the input signal A. Conversely, a binary 1 data bit causes a high signal on the V output and a low on the U output.

The transitions at S and T may be initiated by outputs from AND gates 40 and 42 which, of course, are enabled by the timing pulses from shaper 38. As shown in FIG. 3, at Time T 4, a timing pulse initiates a transition in the output of bistable circuit 48.

Referring to FIG. 3, each data bit transmitted to the demodulating circuit, either a mark (1) or a space (0) bit, is represented by one and one-half cycles in the analogue input signal A. As also illustrated in FIG. 3, one timing pulse at H occurs in each cycle. Thus, the state of the output circuit 48 may be changed at every cycle in response to the frequency-encoded input signal A. However, it may be desirable to detect the data represented on input signal A at more frequent intervals. For this, additional circuitry is required. Such additional circuitry is illustrated in the preferred form of phase-detecting circuit shown in FIG. 2.

As shown in FIG. 2, the signals C and D are fed to a second circuit 54 as well as to the circuit 28. Circuit 54 includes a circuit 56 identical with the circuit 28 and having two OR gates 58 and 60. However, it also includes a pair of inverters 62 and 64. Inverter 62 receives the signal C on lead 10, inverts it, and feeds it to OR gate 58. The inverter 64 receives the signal D on lead 14, inverts it, and feeds it to the OR gate 60.

The signals from the output I of inverter 62 and the output J of inverter 64 are also fed to an AND gate 66. AND gate 66 provides a high to low transition at its output M in response to the lagging edge of a pulse in the lagging one of the C or D signals. It feeds its output to a second differentiating circuit 68 which detects this transition and feeds a negative spike to shaper 70 in response. AND gate 66, differentiating circuit 68 and the shaper 70 are identical with AND gate 34, differentiating circuit 36 and the shaper 38. They provide positive timing pulses at the output N of shaper 70 similar to the timing pulses generated at the output H of shaper 38. Both the timing pulses at N and the timing pulses at H occur at full-cycle intervals of the input signal A. However, those pulses at N occur at about every half-cycle of the input signal A while the timing pulses at H occur at about every full cycle of signal A. Thus, the timing pulses from H and N occur in an alternating sequence spaced apart at half-cycle intervals of signal A.

The circuit 54 has its outputs at K and L and is bistable for certain predetermined periods. As illustrated in FIG. 3, each such period occurs between the time the circuit 54 receives the lagging edge of a pulse in the signal, C or D which is then lagging and the leading edge of the next occurring pulse in either of the signals.

As also illustrated in FIG. 3, a timing pulse is generated at N during each of these periods. When the C signal leads the D signal, the K output of circuit 54 is negative while its L output is positive for its bistable period. When the D signal leads the C signal, the K output of circuit 54 is positive and its L output negative. The former situation is illustrated at time T 5, in FIG. 3 and the latter at time T 3.

The timing pulses from N gate the signals from the outputs K and L of the circuit 54 through AND gates 72 and 74. The outputs of these AND gates are also fed to OR gates 44 and 46. AND gates 72 and 74 perform a function identical with the function of AND gates 40 and 42 except that they pass signals dependent on the state of circuit 54 at each timing pulse generated at N. As noted above, AND gates 40 and 42 pass signals representative of the state of circuit 28 upon the occurrence of each timing pulse H.

Thus, the circuit 54 and the timing pulses generated at N are used to change the state of the output bistable circuit 48 as is required at approximately each half cycle of the input signal A. As an example, in FIG. 3, at Time T 3 the output U of bistable circuit 48 makes a positive to negative transition and the circuit's V output makes a negative to positive transition in response to the occurrence of a timing pulse generated at N.

The operation of the system will now be briefly described. As illustrated with the example in FIG. 3, the data represented by frequency modulations in the input signal A consists of the binary representations 1–0–1–1–0–0–0, this data being received by the demodulating circuit between time T O and a later time T L. The signal B in FIG. 3 is the output of the arrangement (consisting of filters 18, 20 and operational amplifier 16) in the phase-shifting circuit 8 illustrated in FIG. 1. The B signal is shifted with respect to the input signal A such that it lags the signal A when signal A is at the higher frequency designating a binary 1 (or mark) bit. Similarly, the signal B leads the input signal A when the input signal is at the lower frequency designating a binary 0 (or space) bit.

The shaper 4 in FIG. 1 converts the analogue input signal A into digital form as signal C which is fed to the phase detecting circuit 12 on lead 10. Similarly, the signal designated D is the shifted analogue signal B converted to digital form by shaper 22 and fed to the phase-detecting circuit 12 on lead 14.

Referring to the phase-detecting circuit shown in FIG. 2 and to the wave-forms in FIG. 3, the signals C and D are fed to circuit 28 and AND gate 34. At time T 1, AND gate 34 provides a negative transition at its output G in response to the leading edge of the first pulse in the then lagging signal D. This negative-going transition is converted to a negative spike by the differentiating circuit 36 and thereafter to a positive square-wave pulse at H by the inverting shaper 38. Upon the occurrence of this timing signal at H at time T 1, circuit 28 is providing a negative voltage at its E output and a positive voltage at its F output. With these outputs circuit 28 indicates that signal D lags C at T 1. The timing pulse is fed to AND gates 40 and 42 to gate the signals from the E and F outputs respectively of the circuit 28. The outputs of AND gates 40 and 42 at O and Q are fed (via OR gates 44 and 46) to the S and T inputs of bistable circuit 48 which provides a low signal at its V output and a high signal at its U output since the O output of AND gate 40 is low causing a high signal to be applied to the S input of circuit 48. The low signal at the V output of circuit 48 and high signal at its U output are fed over leads 24 and 26 to indicate that the data being received at time T 1 is a binary 1.

The signals C and D are also fed to inverters 62 and 64 in circuit 54. The signals from the outputs I and J of inverters 62 and 64 are fed to AND gate 66. AND gate 66 provides a negative going transition at its output M at time T 2 in response to the trailing edge of the first pulse in signal D which is lagging signal C. A positive timing pulse is generated at the output N of shaper 70 in response to this transition at M.

The outputs from inverters 62 and 64 are also fed to the circuit 56. As illustrated in FIG. 3, at time T 2, the K output of circuit 54 is negative with its L output positive. Thus, circuit 54 indicates that signal C is leading D at T2. These outputs are gated through AND gates 72 and 74 with the timing pulse generated at N. The outputs of AND gates 72 and 74 are fed via OR gates 44 and 46 to the S and T inputs of the circuit 48 in a similar manner as are the outputs of AND gates 40 and 42. At this time, T 2, the outputs of AND gates 72 and 74 cause a high signal at the S input to the circuit 48 and thus circuit 48 continues to provide a positive signal at its U output and a negative one at its V output. This of course, indicates that the data being received at time T 2 is still a binary 1.

Since the initial bit of the data represented by input signal A was a binary 1, the signal C lead D at times T 1 and T 2. However, the second bit of data represented by the input signal A is a 0 bit and, thus, the phase-shifting circuit 8 (FIG. 1) causes signal D to lead signal C.

When the now lagging signal C and leading signal D are fed to the phase-detecting circuit in FIG. 2, a timing pulse occurs at N at time T 3 in response to the lagging edge of a pulse in the lagging signal C. At this time the circuit 54 has its L output negative and its K output positive. Because the input data now represents a O, the state of circuit 54 is opposite to what it was at the time T 2 of the previous timing pulse at N when the data bit was a 1. The negative signal from the L output and the positive one from the K output of circuit 54 are gated through AND gates 72 and 74 with the timing pulse. In response, AND gate 74 continues to provide a low signal at its output R. However, AND gate 72 provides a positive pulse at its output P. This causes a positive to negative transition to occur at the S input of circuit 48 and thus changes the state of the circuit. The U output becomes negative while simultaneously the V output goes positive. These outputs are fed over leads 26 and 24 to indicate that at time T 3 the binary data being received is a 0.

The state of circuit 48 remains stable while the rest of the signals designating the 0 bit are received.

The third bit of data represented by signal A is a 1. Thus, the signal C again leads signal D as they are applied to the phase-detecting circuit. This condition is detected (at time T 4 in FIG. 3) by the phase-detecting circuit of FIG. 2 which provides a low signal on lead 24 (the V output of circuit 48) and a high signal on lead 26 (the U output of circuit 48).

At this time, T 4, a timing pulse at H is generated in response to the leading edge of a pulse in signal D and a positive voltage appears at the F output and a negative voltage at the E output of circuit 28. These outputs are gated with the timing pulse H through AND gates 40 and 42. The output signals of these AND gates at O and Q are fed to the S and T inputs of the circuit 48 via OR gates 44 and 46. This does not cause any change in the signal at input S but effects a negative going transition at the T input which changes the state of the circuit 48. The signal at the U output of circuit 48 goes positive while that at its V input negative. Thus, as the data encoded on the input signal A goes from a 0 to a 1 bit, the state of circuit 48 changes to indicate such change and to represent the 1 bit with digital signals.

The fourth bit of data represented by signal A is also a 1 and thus the output of the phase-detecting circuit remains stable. The fifth bit of data is a binary 0 and thus the output of the phase detecting circuit changes at T 6 in FIG. 3 to indicate the 0 bit.

Subsequent data represented by the frequency of signal A and the phase differences between signals C and D are represented in a similar manner by the digital output signals on leads 24 and 26. In response to each 0 bit of data represented by the frequency-encoded input signal A, a high signal appears on lead 24 and a low signal on lead 26. In response to each 1 bit of data, a low signal appears on lead 24 with a high on lead 26.

In summary, with the demodulating circuit and method of the invention, an analogue input signal A representing binary data by two different frequencies is converted to a signal C comprising a series of square-wave pulses. A phase-shifting circuit 8 provides a signal D which lags or leads the signal C depending on which of the two frequencies is present in signal A. The signals C and D are fed to the phase-detecting circuit 12 which provides a bistable digital output representation of the data contained in the frequency-encoded input signal A.

Preferably, the phase-detecting circuit includes at least one circuit which is bistable for certain periods, the state of the circuit in these periods depending on which of the signals, C or D, is leading. During each period when the circuit is bistable, a timing pulse is provided to gate the circuit's output to an output circuit, the state of which indicates the binary data represented by the frequency-encoded input signal.

It will be appreciated that various changes in the form and details of the above-described preferred embodiment may be effected by persons of ordinary skill without departing from the true spirit and scope of the invention.

I claim:

1. A circuit for decoding data represented by different frequencies in an input signal, said circuit comprising: means responsive to the frequency of said input signal for providing a signal having various phase differences with said input signal, each of said phase differences occurring in response to a different one of said input signal frequencies; means for detecting each of said phase differences; said frequency-responsive means comprising an operational amplifier having an inverting input and a non-inverting input, and a filter connected in a feedback loop between said inverting input and said amplifier output, and wherein said input signal is applied to said non-inverting input.

2. The circuit as recited in claim 1 wherein said frequency-responsive means further comprises another filter connected to said non-inverting input and through which said input signal is applied to said operational amplifier.

3. A circuit for decoding data represented by different frequencies in an input signal, said circuit comprising: means responsive to the frequencies of said input signal for providing a signal having various phase differences with said input signal, each of said phase differences occurring in response to a different one of said input signal frequencies; means for detecting each of said phase differences; said input signals occurring at two different frequencies; said frequency responsive means providing a signal when said input signal is at one of said two frequencies and lags said input signal when said input signal is at the other of said two frequencies; said detecting means providing an output signal indicative of whether the signal from said frequency responsive means lags or leads said input signal, said detecting means comprising:

a. first circuit means for receiving said input signal and the signal from said frequency-responsive means, said first circuit means being bistable for first periods of time while receiving said signals, the state of said first circuit during said first periods being dependent on which of said signals is leading;

b. second circuit means for receiving said input signal and the signal from said frequency-responsive means, said second circuit means being bistable for second periods of time while receiving said signals, the state of said second circuit means during said second periods being dependent on which of said signals is leading; and c. means for providing an output signal indicative of the state of said first circuit means during said first periods and of the state of said second circuit means during said second periods.

4. The circuit as recited in claim 3 wherein said output signal providing means comprises:

a. means for providing a first timing pulse during each of said first periods;

b. means for providing a second timing pulse during each of said second periods; and c. bistable circuit means adapted to respond to the state of said first circuit means in response to each of said first timing pulses, said bistable circuit means also being adapted to respond to the state of said second circuit means in response to each of said second timing pulses.

5. The circuit for decoding data represented by two different frequencies in an input signal, said circuit comprising: means responsive to the frequencies of said input signal for providing a signal having various phase differences with said input signal, each of said phase differences occurring in response to a different one of said input signal frequencies means for detecting each of said phase differences; said input signals occurring at two different frequencies; said frequency-responsive means providing a signal which leads said input signal when said input signal is at one of said two frequencies and lags said input signal when said input signal is at the other of said two frequencies; said detecting means providing an output signal indicative of whether the signal from said frequency-responsive means lags or leads said input signal;

said detecting means being adapted to receive said input signal and the signal from said frequency-responsive means, said input signal and said signal from said frequency-responsive means each comprising a series of digital pulses when received by said detecting means, each of the pulses of the latter signal corresponding to one of the pulses in said input signal and being received by said detecting means concurrently with part of its corresponding pulse in said input signal;

said detecting means comprising:

first circuit means for receiving said input signal and the signal from said frequency-responsive means, said first circuit means being bistable for a first period of time after receiving the leading edges of the pulses in the lagging one of said signals, the state of said first circuit during said first periods being dependent on which of said signals is leading; and means for providing an output signal indicative of the state of said first circuit means during said first periods.

6. The circuit as recited in claim 5 wherein said first circuit means is bistable for each period beginning when it receives the leading edge of one of the pulses in the lagging one of said signals and ending when it receives the lagging edge of the corresponding pulse in the leading one of said signals.

7. The circuit as recited in claim 5 wherein said output signal providing means comprises:

a. means for providing first timing pulses in response to the leading edges of the pulses in the lagging one of said signals; and b. bistable circuit means adapted to respond to the state of said first circuit means in response to each of said first timing pulses.

8. The circuit as recited in claim 5 wherein said detecting means comprises:

a. second circuit means for receiving said input signal and the signal from said frequency-responsive means, said second circuit means being bistable for second periods of time after receiving the lagging edges of the pulses in the lagging one of said signals, the state of said second circuit means during said second periods being dependent on which of said signals is leading; and b. means for providing an output signal indicative of the state of said second circuit means during said second periods.

9. The circuit as recited in claim 8 wherein said second circuit means is bistable for each period beginning when it receives the lagging edge of one of the pulses in the leading one of said signal and ending when it receives the leading edge of the next pulse received in either of said signals.

10. The circuit as recited in claim 8 wherein said output signal providing means comprises:

a. means for providing second timing pulses in response to the lagging edges of the pulses in the lagging one of said signals; and b. bistable circuit means adapted to respond to the state of said second circuit means in responses to each of said first timing pulses.

11. The circuit as recited in claim 5 wherein said detecting means comprises:

a. first circuit means for receiving said input signal and the signal from said frequency-responsive means, said first circuit means being bistable for first periods of time after receiving the leading edges of the pulses in the lagging one of said signals, the state of said first circuit means during said first periods being dependent on which of said signals is leading;

b. second circuit means for receiving said input signal and the signal from said frequency-responsive means, said second circuit means being bistable for second periods of time after receiving the lagging edges of the pulses in the lagging one of said signals, the state of said second circuit means during said second periods being dependent on which of said signals is leading; and c. means for providing an output signal indicative of the state of said first circuit means during said first periods and of the state of said second means during said second periods.

12. The circuits as recited in claim 11 wherein said output signal providing means comprises:

a. means for providing first timing pulses in response to the leading edges of the pulses in the lagging one of said signals;

b. means for providing second timing pulses in response to the lagging edges of the pulses in the laggine one of said signal; and c. bistable circuit means adapted to respond to the state of said first circuit means in response to each of said first timing pulses, said bistable circuit means also adapted to respond to the state of said second circuit means in response to each of said second timing pulses.

13. The circuits as recited in claim 12 wherein said first and second timing pulses occur in an alternating sequence.

14. A circuit for decoding data represented by two different frequencies in an input signal, said circuit comprising:

means responsive to the frequency of said input signal for generating a signal corresponding pulse to pulse to said input signal, the leading edge of a pulse of said generated signal leading the corresponding pulse of said input signal when said input signal is at one of said two frequencies, the leading edge of a pulse of said generated signal lagging behind the corresponding pulse of said input signal when said input signal is at the other of said two frequencies;

means for detecting the phase differences between corresponding pulses of said input signal and said generated signal, said frequency-responsive means including an operational amplifier having an inverting input and a non-inverting input, said input signal being applied to said non-inverting input.

15. A circuit for decoding data represented by two different frequencies in an input signal, said circuit comprising:

means responsive to the frequency of said input signal for generating a signal corresponding pulse to pulse to said input signal, the leading edge of a pulse of said generated signal leading the corresponding pulse of said input signal when said input signal is at one of said two frequencies, the leading edge of a pulse of said generated signal lagging behind the corresponding pulse of said input signal when said input signal is at the other of said two frequencies; means for detecting the phase differences between corresponding pulses of said input signal and said generated signal, said detecting means including first circuit means for receiving said input signal and said generated signal, said first circuit means being bistable for first periods of time while receiving said signals, the state of said first circuit during said first periods being dependent on which of said signals is leading; second circuit means for receiving said input signal and said generated signal, said second circuit means being bistable for second periods of time while receiving said signals, the state of said second circuit means being dependent on which of said signals is leading; and means for providing an output signal indicative of the state of said first circuit means during said first periods and of the state of said second circuit means during said second periods.

16. In a circuit for demodulating an input signal modulated between first and second predetermined frequencies, the combination comprising:

means for splitting said input signal into two bipolar square wave signals having the same frequency as said input signal, each polarity reversal in one of said signals being coincident with a corresponding polarity reversal occurring in the other of said signals;

phase shifting means constructed and arranged to shift the phase of one of said square wave signals with respect to the other to produce a shifted square wave signal, said phase shift being such that when said signals occur at said first predetermined frequency the shifted signal leads the nonshifted signal and when said signals occur at the second predetermined frequency the shifted signal lags the nonshifted signal; and phase detection means for comparing the time of occurrence of each polarity reversal contained in said shifted signal with respect to the time of occurrence of the corresponding polarity reversal in said nonshifted signal and for generating a bistable output signal having a first state when the polarity reversals in said shifted signal lead the corresponding polarity reversals in said nonshifted signal and having a second state when the polarity reversals in said shifted signal lag the corresponding polarity reversals in said nonshifted signal.

17. The demodulating circuit set forth in claim 27, wherein said phase detection means further comprises:

sampling circuit means responsive to said shifted and nonshifted signals for generating a sampling pulse each time said two signals assume the same polarity state;

first bistable circuit means operable in response to each corresponding pair of positive polarity reversals occurring in said shifted and non-shifted signals to generate a first bistable output signal representative of the signal containing the leading positive polarity reversal;

second bistable circuit means operable in response to each corresponding pair of negative polarity reversals occurring in said shifted and nonshifted signals to generate a second bistable output signal representative of the signal containing the leading negative polarity reversal; and output circuit means responsive to each said sampling pulse to generate a final bistable output signal alternately representative of the states of the first and second bistable output signals.

* * * * *